S. R. EARLS.
Stock Car.

No. 232,952.  Patented Oct. 5, 1880.

WITNESSES:  INVENTOR:
J. H. Freeman  Samuel R. Earls.
J. C. Sebald
  Prentice ATTORNEY.

UNITED STATES PATENT OFFICE.

SAMUEL R. EARLS, OF BALLSTON, NEW YORK.

STOCK-CAR.

SPECIFICATION forming part of Letters Patent No. 232,952, dated October 5, 1880.

Application filed October 23, 1879.

*To all whom it may concern:*

Be it known that I, SAMUEL R. EARLS, of Ballston, in the county of Saratoga and State of New York, have invented a new and useful Improvement in Railroad Stock or Freight Cars, which improvement is fully set forth in the following specification and accompanying drawings, in which—

Figure 1:
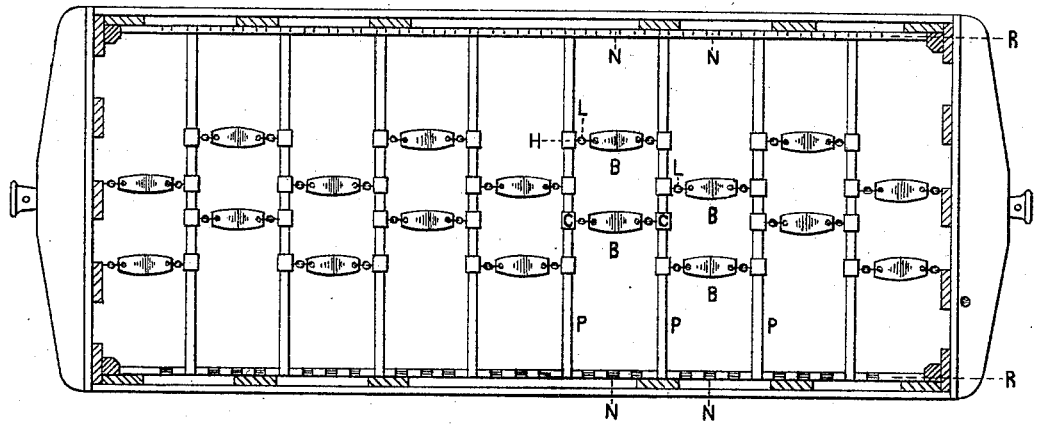
Figure 2:
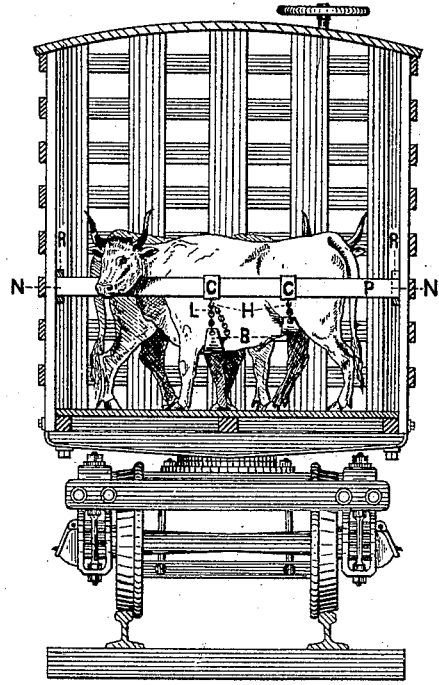

Figure 1 represents a plan, and Fig. 2 a vertical transverse section, of such improved stock or freight car.

The object of my improvement is to provide an arrangement which shall obviate the jostling and falling of cattle during transportation, thus securing perfect comfort to the animals so transported.

The sides of a regular car, Figs. 1 and 2, are provided with suitable horizontal racks or notched rails R, which are parallel to each other and in the same plane. Transversely to these racks, at suitable distances apart, are placed the bars P, the same being received by the opposite and corresponding perforations or notches N of the racks R, each adjacent pair of bars P thus forming a stall, of which the width may be regulated at will. Laterally to these stalls on the bars P are arranged belts B, which, being provided with collars C encircling and sliding on said bars, render it possible to regulate the distance apart of said belts. The belts B may be regulated in length of girth by means of chain-links in conjunction with suitable hooks H for their attachment.

The stalls so arranged having been properly regulated for the animals or stock, the belts B are easily drawn under the animals to the required tension, and fastened, by the most convenient links L, to the hooks H, thus, in a measure, assisting the animals in their support, and preventing them from falling or lying down.

It is obvious that but one belt between each pair of bars may be used in place of two, and by removing the bars and stowing them in a part of the car set apart for that purpose said car may be used in the ordinary transportation of freight.

What I claim as new, and desire to secure by Letters Patent, is—

In a railroad stock or freight car, the detachable transverse bars P, supported by the racks R, in combination with the lateral adjustable belts B, sliding longitudinally, by means of the collars C, on said bars P, substantially as shown and described.

SAMUEL R. EARLS.

Witnesses:
JACOB DUBOIS,
C. M. BENJAMIN.